G. W. MOOERS.
Car-Wheels.

No. 153,838.

Patented Aug. 4, 1874.

Witnesses.

Inventor
G. W. Mooers.
by his Attys.

UNITED STATES PATENT OFFICE.

GEORGE W. MOOERS, OF WILKESBARRE, PENNSYLVANIA.

IMPROVEMENT IN CAR-WHEELS.

Specification forming part of Letters Patent No. 153,838, dated August 4, 1874; application filed March 21, 1874.

*To all whom it may concern:*

Be it known that I, GEORGE W. MOOERS, of Wilkesbarre, in the county of Luzerne and State of Pennsylvania, have invented a new and Improved Car-Wheel; and I do hereby declare the following to be a full, clear, and exact description of the same, reference being had to the accompanying drawings forming part of this specification, in which—

Figure 1:
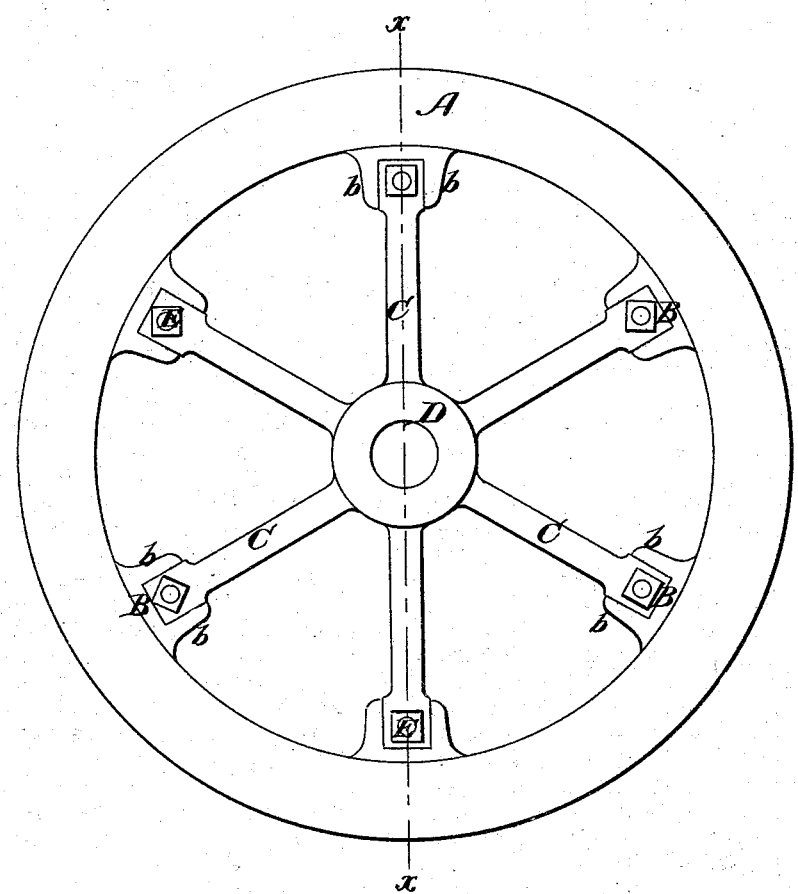
Figure 2:
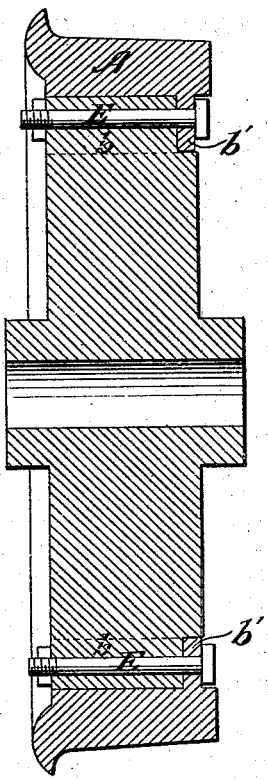

Figure 1 is a side elevation of my improved wheel, and Fig. 2 a section through line $x\ x$, Fig. 1.

Similar letters of reference in the accompanying drawings denote the same parts.

This invention relates to that class of car-wheels having a hub and spokes, and in which the tread is composed of a casting separate from the hub and spokes, for the purpose of removing the tread when worn or making it of harder material than the rest of the wheel. The object of my invention is to provide for public use a car-wheel of the above-named class, in which the tread is adapted to be easily and quickly removed from or attached to the spokes, and securely held while attached. To this end the invention consists in providing the interior of the tread with sockets open at one end and adapted to receive the ends of the spokes, and in securing the spokes and sockets together by bolts or rivets passing through both, as I will now proceed to describe.

In the drawings, A represents the rim or tread, which is cast in a single piece, provided on the interior with transverse lugs $b$, projecting inward radially, said lugs being arranged in pairs, and each pair being connected at one end by a plate, $b'$, the lugs and plate forming a socket, B, open at one end. C represents the spokes, which are cast in one piece with the hub D. The ends of the spokes C are cast of such size as to fit in the sockets B, and each is provided with a bolt-hole registering with a similar hole in the end plates $b'$ of the sockets B. E represents bolts or rivets passing through the bolt-holes of the spokes and sockets, and securely connecting both.

It will be seen that this construction adapts the tread to be readily attached to or removed from the spokes, and holds both parts securely together.

I am aware that a wheel has been constructed having its tread and spokes cast in separate pieces, the tread being provided with sockets, in which the ends of the spokes are held by solder. This construction, however, is by no means as durable as mine. The attachment of the tread to the spokes requires more time, and the removal of the latter necessitates the breakage of the sockets.

In my arrangement the rim can be removed, without breaking any of the parts, by cutting off the heads of the rivets or bolts.

I claim as my invention—

The rim A, having the internal transverse sockets B, open at one end, in combination with the spokes C and bolts E, substantially as described, for the purposes specified.

GEORGE W. MOOERS.

Witnesses:
ELIJAH THOMAS,
HENRY OERKVITZ.